United States Patent [19]

Okazaki

[11] Patent Number: 5,856,983
[45] Date of Patent: Jan. 5, 1999

[54] MAGNETIC DISK DRIVE AND ERROR CORRECTION METHOD

[75] Inventor: Akifumi Okazaki, Tokyo, Japan

[73] Assignee: Kabushiki Kaisha Toshiba, Kanagawa-ken, Japan

[21] Appl. No.: 792,487

[22] Filed: Jan. 31, 1997

[30] Foreign Application Priority Data

Jun. 27, 1996 [JP] Japan ................................ 8-167540

[51] Int. Cl.⁶ ............................................ G06F 11/00
[52] U.S. Cl. ............................................ 371/21.4; 360/67
[58] Field of Search .............................. 371/21.4, 40.2, 371/40.4, 40.14, 41, 5.1, 3, 37.4, 48; 360/46, 32, 50, 53, 67, 75, 65; 374/5, 41; 395/183.18, 183.2, 185.01, 185.07; 365/201, 232

[56] References Cited

U.S. PATENT DOCUMENTS

| | | | |
|---|---|---|---|
| 4,462,090 | 7/1984 | Iizuka ........................................ | 365/185 |
| 4,531,203 | 7/1985 | Masuoka et al. ......................... | 365/218 |
| 4,698,787 | 10/1987 | Mukherjee et al. ..................... | 365/185 |
| 4,979,146 | 12/1990 | Yokoyama et al. ...................... | 365/185 |
| 4,979,174 | 12/1990 | Cheng et al. ............................. | 371/41 |
| 5,029,130 | 7/1991 | Yeh ........................................... | 365/185 |
| 5,194,925 | 3/1993 | Ajika et al. ............................... | 257/314 |
| 5,233,482 | 8/1993 | Gailbraith et al. ........................ | 360/46 |
| 5,280,446 | 1/1994 | Ma et al. .................................. | 365/185 |
| 5,303,187 | 4/1994 | Yu ............................................. | 365/185 |
| 5,371,745 | 12/1994 | Kiyonaga et al. ........................ | 371/13 |
| 5,471,351 | 11/1995 | Ishiguro .................................... | 360/53 |
| 5,527,110 | 6/1996 | Abraham et al. ......................... | 374/5 |
| 5,530,705 | 6/1996 | Malone, Sr. .............................. | 371/5.1 |
| 5,559,460 | 9/1996 | Cunningham ............................ | 327/179 |
| 5,610,929 | 3/1997 | Yamamoto ................................ | 371/40.1 |
| 5,638,225 | 6/1997 | Tsuboi et al. ............................. | 360/27 |
| 5,696,643 | 12/1997 | Tsuwako et al. ......................... | 360/73.03 |
| 5,701,314 | 12/1997 | Armstrong et al. ...................... | 371/40.3 |
| 5,715,110 | 2/1998 | Nishiyama et al. ...................... | 360/67 |

FOREIGN PATENT DOCUMENTS

| | | |
|---|---|---|
| 355087491 | 7/1980 | Japan . |
| 357091561 | 6/1982 | Japan . |
| 361131484 | 6/1986 | Japan . |

*Primary Examiner*—Robert W. Beausoliel, Jr.
*Assistant Examiner*—Nadeem Iqbal
*Attorney, Agent, or Firm*—Limbach & Limbach L.L.P.

[57] ABSTRACT

A magnetic disk drive comprises a magnetic recording medium, a magnetic recording head for reading/writing data from/onto the magnetic recording medium, and detecting means for detecting thermal asperity by comparing the data read out from the magnetic recording medium with a predetermined value.

20 Claims, 4 Drawing Sheets

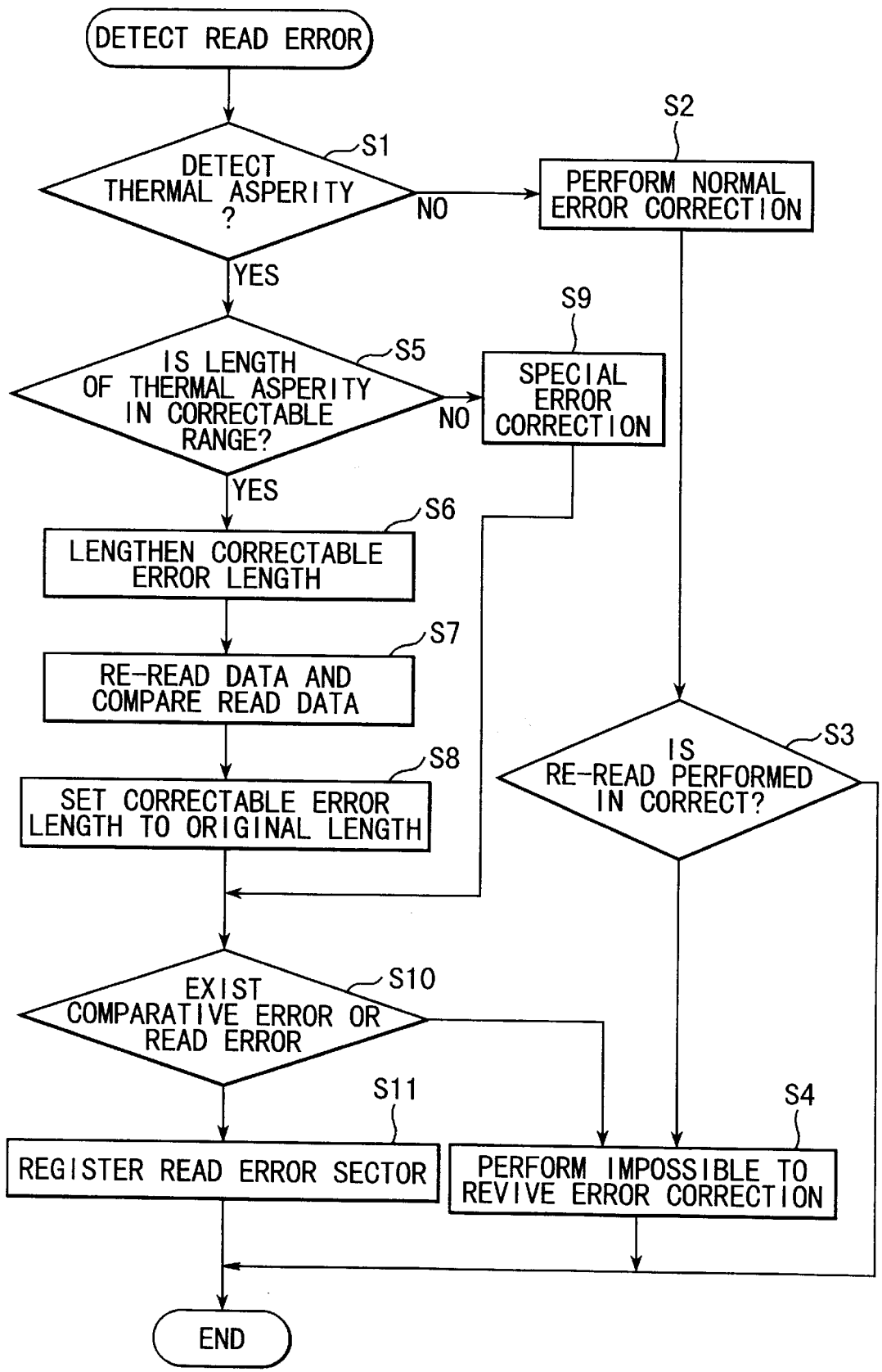
F I G. 7

MAGNETIC DISK DRIVE AND ERROR CORRECTION METHOD

BACKGROUND OF THE INVENTION

This invention relates to a magnetic disk drive and error correction method.

The constitution of the conventional magnetic disk drive is shown in FIG. 1.

The magnetic disk drive is a device for recording information onto a magnetic recording medium 100 by use of a read/write head 200 (hereinafter referred to as "head") and for reproducing the information recorded on the magnetic recording medium by use of the head 200.

As shown in FIG. 1, the circuit for controlling the magnetic disk drive comprises eight blocks: Central Processing Unit (CPU) 1; Read Only Memory (ROM) 2; Random Access Memory (RAM) 3, Hard Disk Controller (HDC) 4; Read/Write (R/W) circuit 5; servo-control circuit 6; spindle motor control circuit 7; and head amplifier 8.

The operations of the above-mentioned blocks will be described below.

CPU 1 controls all the parts of the magnetic disk drive. The control process is executed in order of the steps recorded on the ROM 2.

ROM 2 stores the control steps of the magnetic disk drive.

RAM 3 temporarily stores the data transmitted to the HDC 4 from a host computer (not shown) and the R/W circuit 5, and functions as a memory for the CPU which operates on the basis of the sequences recorded in the ROM 2 in advance.

The HDC 4 interfaces between the host computer and the magnetic disk drive.

The R/W circuit 5 encodes the data transmitted from the HDC 4 in the form suitable for the magnetic recording, and decodes the data transmitted from the head amplifier 8.

The servo-control circuit 6 positions the head 200 on a designated cylinder in accordance with the instruction from the CPU 1.

The spindle motor control circuit 7 controls the rotation speed of the magnetic recording medium in accordance with instructions from the CPU 1.

The head amplifier 8 amplifies the signal read out by the head 200 and controls the electric current flowing into the head 200 in accordance with write data transmitted from the R/W circuit 5.

The basic operation of the magnetic disk drive having the above-mentioned elements will be described below.

The data recorded on the magnetic recording medium is read by the head 200, and amplified by the head amplifier 8. The data amplified by the head amplifier 8 is transmitted to the R/W circuit 5. The data transmitted to R/W circuit 5 is demodulated into the original form and transmitted to the HDC 4.

FIG. 2 is a block diagram showing the schematic constitution of the R/W circuit 5. The R/W circuit 5 has AGC circuit 51; analog filter 52; A/D converter 53; digital filter 54; Viterbi decoder 55; and demodulator 56. The AGC circuit 51 adjusts (amplifies) the amplitude of the output signal output from the head 200 such that a constant level of amplitude can be obtained irrelevant of the magnitude of the output signal. The analog filter 52 transmits only signals with frequencies within a predetermined band. The A/D converter 53 converts the input analog signal passing through the analog filter 52 into a digital signal. The digital filter 54 transmits the digitalized signal with frequencies within a predetermined band. The Viterbi decoder 55 decodes the digital signal passing through the digital filter 54. The demodulator 56 demodulates the decoded data into the original form.

In the general magnetic disk drive, the HDC 4 adds redundant data of several bytes to the data transmitted from the host computer when the transmitted data is written in the magnetic recording medium, in order to correct reading errors.

By use of the transmitted data and redundant data, the HDC 4 checks whether or not the data transmitted from the R/W circuit 5 is correct when the data is read, and corrects the data which can be corrected, in real time (this correction method is called "ON-THE-FLY correction" and is widely used).

The number of the errors which can be corrected by "ON-THE-FLY correction" increases as the redundant data length is lengthened, but the formatting efficiency decreases, in contrast. Therefore, the operating system is designed to have the optimum redundant data length which is determined in view of both the reading error rate and the formatting efficiency.

The upper limit of the number of correctable data errors which can be corrected with a predetermined redundant data length depends on the correction-error rate. Generally, when the upper limit of correctable data errors is raised without lengthening a predetermined redundant data length, the correction-error rate increases. Accordingly, in the conventional magnetic disk drive, the maximum values of the redundant data length and the number of correctable data errors are determined in view of the formatting efficiency, the reading error rate before the error correction, and the correction-error rate.

In recent days, a MR head is used for reading data in a magnetic recording medium. However, when the MR head is used, friction heat (called "thermal asperity") generated between the magnetic recording portion of the head and the protrusions of the magnetic recording medium causes distortion in the signal waveform, as shown in FIG. 3.

If the distortion is generated, the data in the distortion portion cannot be correctly read, and reading errors occur. The errors can be corrected by the HDC 4 when the error length is ranged within the scope of the length which can be corrected by the ON-THE-FLY correction.

However, the length of the error which can be corrected by the ON-THE-FLY correction is calculated in view of the correction-error rate, and fixed at a value, as mentioned before. Accordingly, if the length of errors which are caused by the thermal asperity as shown in FIG. 3 even slightly exceed over the correctable error length, the HDC 4 cannot correct the errors.

As described above, the conventional magnetic disk drive has a problem that error-correction cannot be executed when the length of the error which is caused by the thermal asperity exceeds the correctable error length.

BRIEF SUMMARY OF THE INVENTION

An object of the present invention is to provide a correction system capable of correcting a reading error due to thermal asperity by the ON-THE-FLY correction.

In order to attain this object, the present invention presents the following measures.

The present invention is characterized by comprising a thermal asperity detecting circuit for detecting an occurrence of the thermal asperity. The present invention is further characterized in that the length of the error which can be corrected by the ON-THE-FLY correction is lengthened (that is, the error-correction rate is increased) when the reading error which cannot be corrected by the ON-THE-FLY correction is generated at the portion at which the generation of the thermal asperity is detected. After the correctable error length is changed (lengthened), data is read again to correct the reading error. After the error is corrected, the correctable error length is set to the original value again.

More specifically, a magnetic disk drive of the present invention comprises a first magnetic recording medium, a magnetic recording head for reading/writing data from/onto the magnetic recording medium, and detecting means for detecting thermal asperity by comparing the data read out from the magnetic recording medium with a predetermined value. This magnetic disk drive further comprises a central processing unit for controlling the predetermined value. In this magnetic disk drive, the magnetic recording head has a plurality of heads, the magnetic recording medium has a plurality of magnetic recording media each of which is divided into a plurality of zones, and the predetermined value can be set at the plurality of heads and zones.

The second magnetic disk drive of the present invention comprises a magnetic recording medium, a magnetic recording head for reading/writing data from/onto the magnetic recording medium, detecting means for detecting thermal asperity, and rereading means for executing rereading by increasing the correctable error length to longer than that of the normal ON-THE-FLY correction when both reading error and thermal asperity are detected. The second magnetic disk drive further comprises determining means for determining whether or not correction-error exist by comparing the plurality of read-out data when a plurality of readings by the rereading means are successively executed. In the second magnetic disk drive, when it is determined as a result of the re-reading by the rereading means that the error-correction is correctly executed, a sector in which the reading error occurs is registered as a defective sector, and data stored in the sector is transferred to the other sector.

The third magnetic disk drive of the present invention comprises a magnetic recording medium, a magnetic recording head for reading/writing data from/onto the magnetic recording medium, detecting means for detecting thermal asperity, and rereading means for executing error-correction different from normal error correction when both reading error and thermal asperity are detected and an error which cannot be corrected even with a maximum error correction ability of the normal ON-THE-FLY correction, is detected.

The method of error correction of the present invention comprises the steps of detecting a reading error, detecting thermal asperity, setting error correction ability at a higher level than that of normal ON-THE-FLY correction, and executing rereading data.

According to the present invention, the reading error which cannot be corrected in the conventional correction system by the ON-THE-FLY correction can be corrected by lengthening the correctable error length of the ON-THE-FLY correction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a flowchart of the operation process of the error correction of the present invention.

DESCRIPTION OF THE INVENTION

This invention can be more fully understood from the following detailed description when taken in conjunction with the accompanying drawings.

Figure 4:
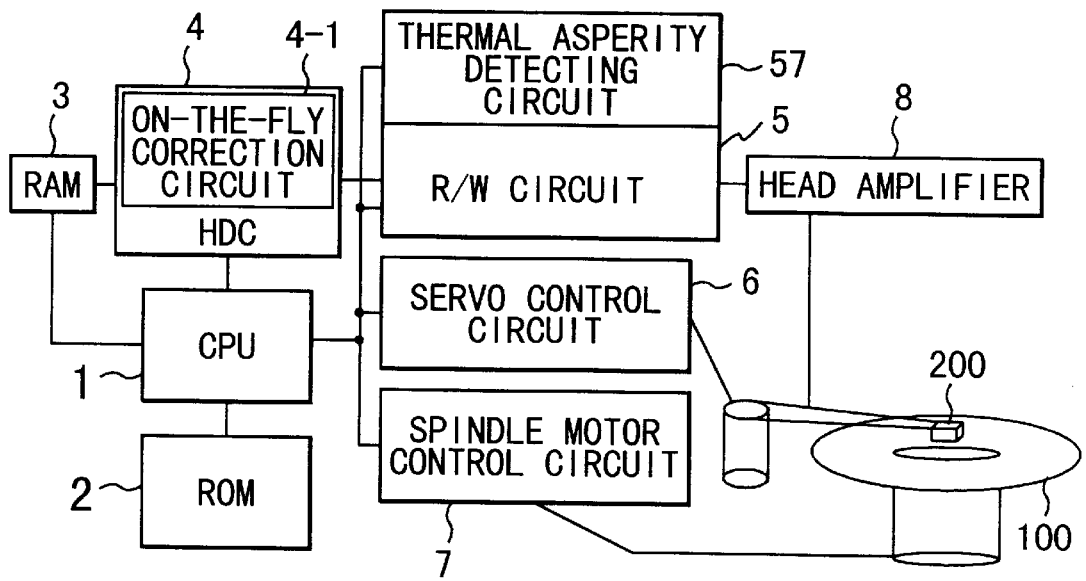
FIG. 4 is a block diagram showing the constitution of the magnetic disk drive of the present invention.

FIG. 4 is a block diagram showing the constitution of the magnetic disk drive of the present invention. In this drawing, the same reference numerals as in FIG. 1 are used to designate the same portions for simplicity of illustration, and the detailed description will be omitted.

Figure 1:
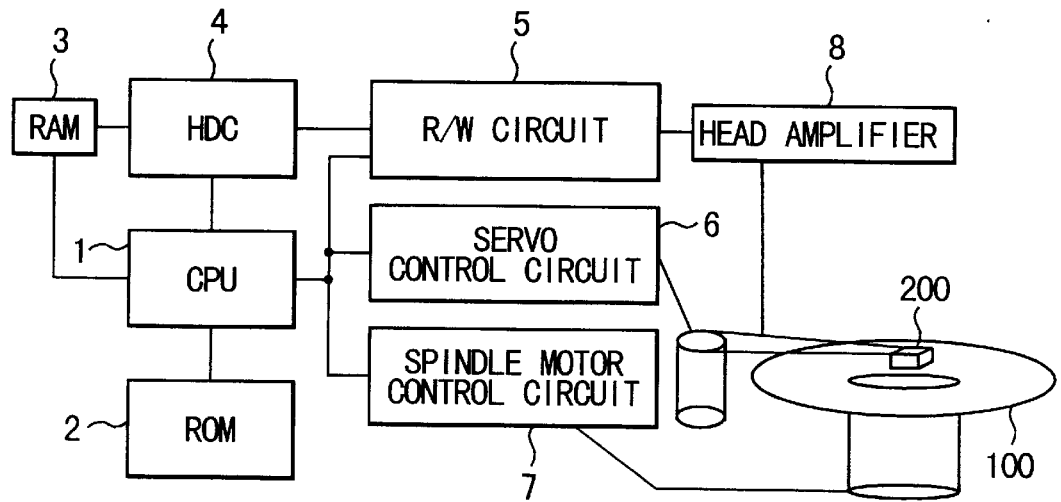
FIG. 1 is a block diagram showing the constitution of the conventional magnetic disk drive.
Figure 2:
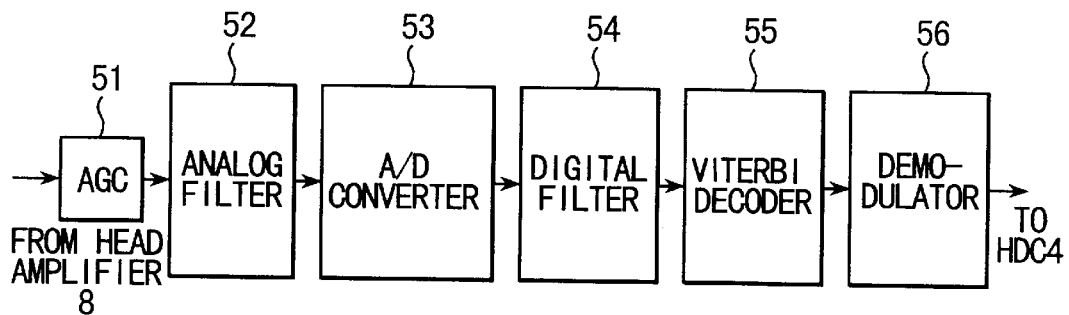
FIG. 2 is a block diagram showing the schematic constitution of the conventional R/W circuit.
Figure 3:
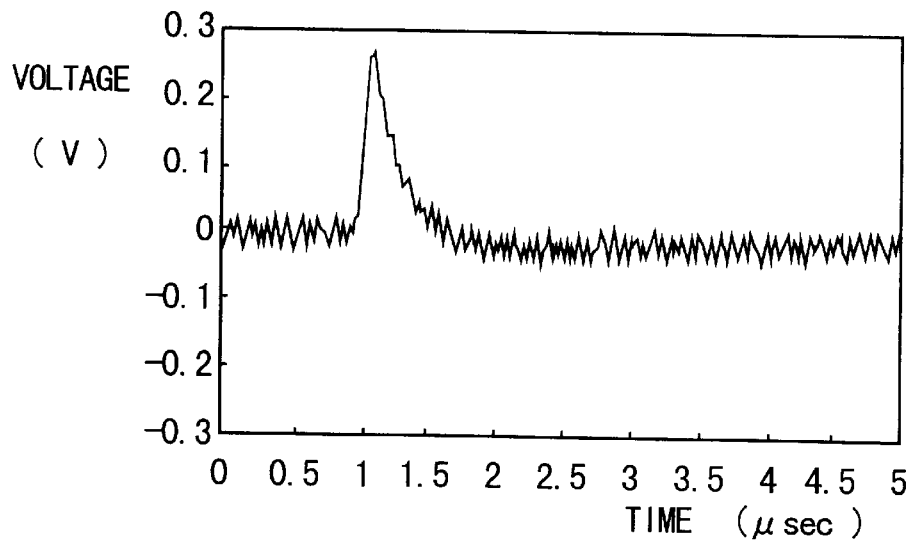
FIG. 3 is a graph showing a waveform of output signal of an AGC circuit when the thermal asperity is occurred.

The apparatus shown in FIG. 4 differs from that of FIG. 1 in the point that an ON-THE-FLY correction circuit 41 in which the error correction length can be changed and a thermal asperity detecting circuit 57 are contained in the HDC 4 and R/W circuit, respectively, are added.

The change of the ON-THE-FLY error correction length is executed by changing the correctable error length of the ON-THE-FLY correction 41 by rewriting the register in the HDC 4 by a CPU 1.

Figure 5:
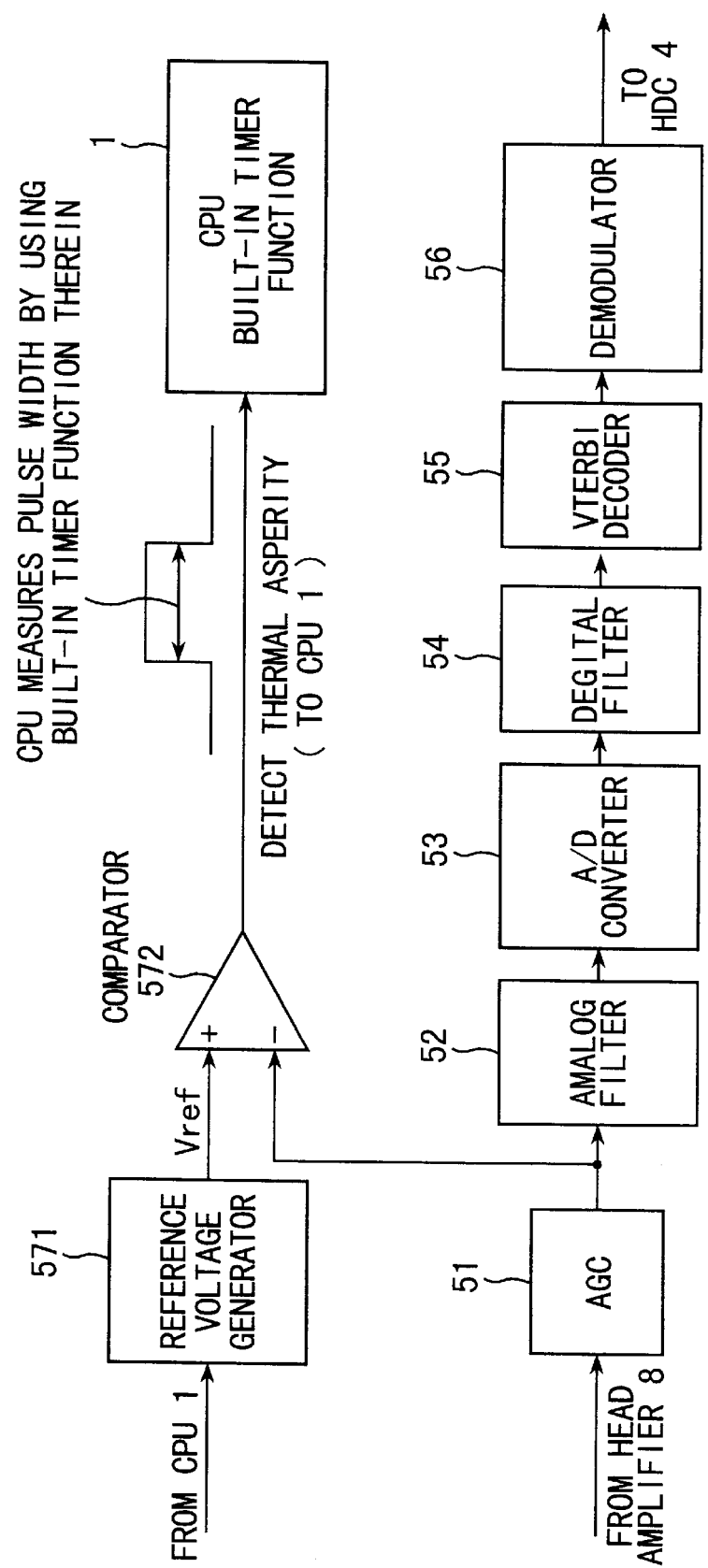
FIG. 5 is a block diagram showing an example of a thermal asperity detecting circuit.

The thermal asperity detecting circuit 57 comprises elements such as reference voltage generator 571 and comparator 572 as shown in FIG. 5. The reference voltage generator 571 generates a reference voltage for determining whether or not thermal asperity has occurred. The comparator 572 compares the output from an AGC circuit 51 with the reference voltage. The comparator 572 determines that thermal asperity is detected when the output of the AGC circuit 51 is higher than the reference voltage, and outputs a thermal asperity detection signal.

The thermal asperity can be detected by the above-mentioned elements, as described below more specifically.

Figure 6:
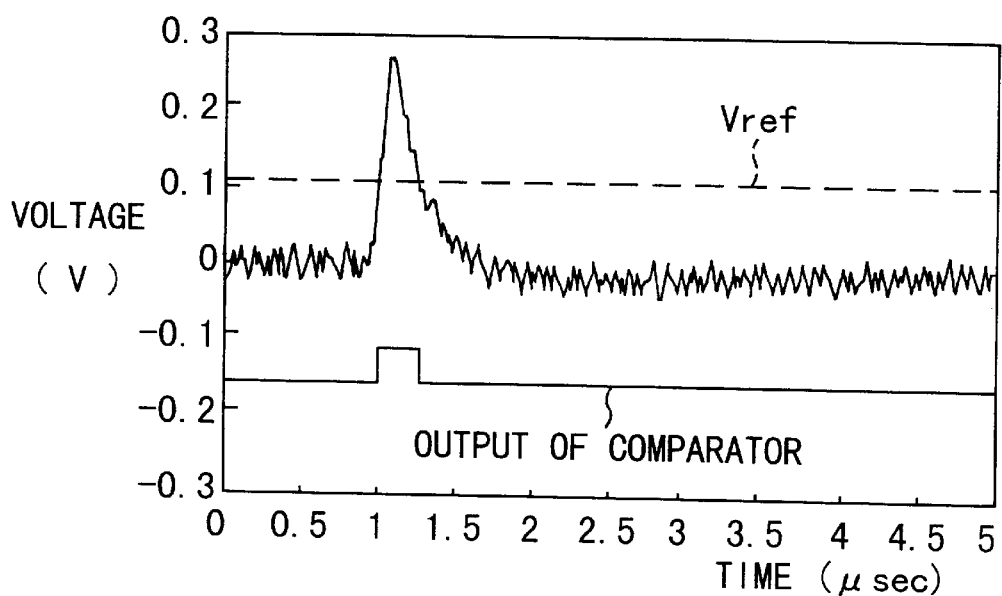
FIG. 6 is a waveform of output signal of an AGC circuit when the thermal asperity is occurred.

FIG. 6 shows the waveform of the output signal of the AGC circuit 51 when the thermal asperity is generated. The output of the AGC circuit 51 has a constant level except when thermal asperity is generated. When thermal asperity is generated, the waveform is distorted, as shown in FIG. 6. Accordingly, the thermal asperity can be detected by setting the reference voltage $V_{ref}$ at the maximum level and setting the comparator 572 to generate a pulse when the signal level of the AGC circuit 51 exceeds the reference voltage $V_{ref}$. The optimum value of the reference voltage $V_{ref}$ may vary in accordance with conditions such as the output signal resolving power of the magnetic recording head and S/N ratio, and it is thus preferable that the optimum value can be changed by the CPU 1. When the resolving power is high and the S/N ratio is low, it is desirable to set the reference voltage $V_{ref}$ at a little higher level than the normal level.

It is also desirable to input the output of the comparator 572 to the CPU 1 to measure the duration time of the thermal asperity. This duration time can be obtained by measuring the width of the pulse output from the comparator 572 with use of the timer function of the CPU 1. By obtaining the thermal asperity duration time, it can be determined whether or not the error due to the thermal asperity can be corrected. Assume that data of 9 bytes can be corrected by ON-THE-FLY correction in a channel of 50 Mbps, the maximum duration time of the thermal asperity the error caused by which can be corrected is represented as follows:

$$8 \times 9/(5 \times 10^{-6}) = 1.44 \mu sec$$

The operation of the apparatus constituted as above will be described below in conjunction with the flowchart of FIG. 7. The flowchart of FIG. 7 represents the operation process of the error correction of the present invention. The process shown in FIG. 7 begins from a time when a reading error occurs.

At first, when the reading error occurs, it is determined whether or not thermal asperity is detected (step 1). When the thermal asperity is not detected, a normal error correction is executed (step 2), and then it is determined whether the rereading of data is correctly executed (step 3). When the re-reading of data is correctly executed, the error correction process has completed. When the rereading of data is not correctly executed, the error correction process for the irrecoverable error is executed (step 4), and then the error-correction has completed.

When thermal asperity is detected in step 1, it is determined whether or not the thermal asperity length (duration time) is within a correctable range (step 5). When the thermal asperity length (duration time) is within the correctable range, the length of the error which can be corrected by the ON-THE-FLY correction is lengthened (step 6). When the error is determined to be an uncorrectable one in step 5, a special error correction is executed by turning ON the circuit for correcting the waveform distortion due to thermal asperity (step 9), then step 10 is executed.

After step 6, rereading is executed for a predetermined time. When the rereading is correctly executed, the data after the error correction is compared with the data before the error correction to check whether the error correction occured (step 7).

The value of the correctable error length by ON-THE-FLY correction is then set back to the original one, that is, the value set in the register in the HDC 4 is set back to the original one (step 8).

Then, it is determined whether or not comparative error or reading error exists (step 10). When no error exists and the error correction is executed for a plurality of times in one sector, the sector is registered as a defective sector such that the defective sector will not be used thereafter, and the data stored in the defective sector is transferred to the other sector (step 11). When some errors are found in step 10, step 4 is executed to execute the irrecoverable error correction, and the error correction process has been completed.

It is understood that the present invention is not limited to the embodiments described above.

For example, in the above embodiment, the voltage comparing circuit is used for detecting the thermal asperity. The current comparing circuit may be used instead of the voltage comparing circuit. Further, in the above embodiment, the output of the AGC circuit is used as the output of the reading data. The signal read by the magnetic recording head may be used as the reading data.

The reference voltage may not be necessarily fixed, and may be varied. When the reference voltage is changed, it is desirable to set the system such that the value may be adjusted by the CPU.

It is further understood by those skilled in the art that various changes and modifications may be made in the invention without departing from the spirit and scope thereof.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:
1. A magnetic disk drive comprising:
    a magnetic recording medium;
    a magnetic head for reading/writing data from/onto the magnetic recording medium;
    detecting means for detecting thermal asperity; and
    rereading means for executing rereading by increasing correctable error length to longer than that of normal ON-THE-FLY correction when both reading error and thermal asperity are detected.
2. A magnetic disk drive according to claim 1, further comprising determining means for determining whether or not correction-error exists by comparing said plurality of read-out data when a plurality of readings by said rereading means are successfully executed.
3. A magnetic disk drive according to claim 1, wherein, when it is determined as a result of the rereading by said rereading means that the error-correction is correctly executed, a sector in which a reading error has accured is registered as a defective sector, and data stored in the sector is transferred to another sector.
4. A magnetic disk drive comprising:
    a magnetic recording medium;
    a magnetic head for reading/writing data from/onto the magnetic recording medium;
    detecting means for detecting thermal asperity; and
    rereading means for executing error correction different from normal error correction when both reading error and thermal asperity are detected and an error which cannot be corrected even with a maximum error correction ability of normal ON-THE-FLY correction is detected.
5. A method of error correction in a magnetic disk for reading/writing data from/onto the magnetic recording medium, comprising the steps of:
    detecting a reading error,
    detecting thermal asperity, outputting a thermal asperity detection signal when thermal asperity is detected, and rereading of data is not correctly executed;
    executing rereading data different from normal error correction by setting error correction ability at a higher level which otherwise cannot be corrected with a maximum error correction ability of normal ON-THE-FLY correction.

6. A magnetic disk drive comprising:

a magnetic recording medium;

a magnetic head for reading/writing data from/onto the magnetic recording medium;

a head amplifier for amplify the data read by said magnetic head;

a read/write circuit for performing analog amplification of the data amplified from said head amplifier and decoding the data to a digital signal;

a thermal asperity detection circuit for detecting an analog signal amplified by said read/write circuit and outputting a thermal asperity detection signal;

a hard disk controller for performing a read operation of the digital signal output from said read/write circuit ; and a central processing unit for setting an error correction length to said hard disk controller on the basis of the thermal asperity detection signal from said thermal asperity detection circuit, said central processing unit resetting an error correction length to said hard disk controller, which is larger than a predetermined error correction length, to said hard disk controller and performing a reread operation when said central processing unit receives the thermal asperity detection signal output from said thermal asperity detection circuit, wherein said hard disk controller performs a read operation by said predetermined error length set in said central processing unit.

7. A magnetic disk drive according to claim 6, further comprising determining means for determining whether correction-error exists by comparing a plurality of read-out data when a plurality of readings by said rereading means are successfully executed.

8. A magnetic disk drive according to claim 6, wherein a sector in which the reading error has occurred is registered as a defective sector, and data stored in the sector is transferred to another sector, when it is determined as a result of rereading that error-correction has been correctly executed.

9. A magnetic disk drive according to claim 6, wherein said central processing unit executes error correction when thermal asperity is detected and an error which cannot be corrected even with a maximum error correction ability of the normal ON-THE-FLY correction is detected.

10. A method of error correction in a magnetic disk drive for reading/writing data from/onto a magnetic recording medium, comprising the steps of:

detecting a reading error;

detecting thermal asperity;

performing read operation when read error can be corrected;

outputting a thermal asperity detection signal when thermal asperity is detected;

setting error correction ability at a higher level than that of normal ON-THE-FLY correction when a thermal asperity signal is output and rereading of data is not correctly executed; and executing rereading of data.

11. A magnetic disk drive as in claim 1, wherein said detecting means further comprises means for comparing an output signal of an AGC circuit with a reference value and for determining that thermal asperity exists when the output signal is greater than the reference value.

12. A magnetic disk drive as in claim 11, wherein said reference value is adjustable.

13. A magnetic disk drive as in claim 11, wherein said comparing means is a voltage comparing circuit for comparing the output signal of the AGC circuit with the reference value, said reference value being a reference voltage.

14. A magnetic disk drive as in claim 11, wherein said comparing means is a current comparing circuit for comparing the output signal of the AGC circuit with the reference value, said reference value being a reference current.

15. A magnetic disk drive as in claim 4, wherein said detecting means further comprises means for comparing an output signal from an AGC circuit with a reference value and for determining that thermal asperity exists when the output signal is greater than the reference value.

16. A magnetic disk drive as in claim 15, wherein said reference value is adjustable.

17. A magnetic disk drive as in claim 15, wherein said comparing means is a voltage comparing circuit for comparing the output signal of the AGC circuit with the reference value, said reference value being a reference voltage.

18. A magnetic disk drive as in claim 15, wherein said comparing means is a current comparing circuit for comparing the output signal of the AGC circuit with the reference value, said reference value being a reference current.

19. The method of claim 5, wherein the detecting step includes the steps of comparing an output signal from an AGC circuit with a reference value and determining that thermal asperity exists when the output signal is greater than the reference value.

20. The method of claim 19, wherein the detecting step includes the step of adjusting the reference value.

* * * * *